(12) United States Patent
Hunia et al.

(10) Patent No.: US 6,924,919 B2
(45) Date of Patent: Aug. 2, 2005

(54) POLYMERIC ELECTROCHROMIC DEVICES

(75) Inventors: Robert M. Hunia, Kittanning, PA (US); Thomas G. Rukavina, New Kensington, PA (US); Chia-Cheng Lin, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/978,882

(22) Filed: Oct. 16, 2001

(65) Prior Publication Data

US 2002/0048678 A1 Apr. 25, 2002

Related U.S. Application Data

(60) Provisional application No. 60/241,039, filed on Oct. 17, 2000.

(51) Int. Cl.[7] ............................. G02F 1/15; G02F 1/153; H01L 21/00
(52) U.S. Cl. ........................ 359/265; 359/273; 359/275; 438/69
(58) Field of Search .................................. 359/265, 273, 359/274, 275; 438/69, 412, 432; 428/432

(56) References Cited

U.S. PATENT DOCUMENTS

| | | | | |
|---|---|---|---|---|
| 4,435,048 A | * | 3/1984 | Kamimori et al. | 359/275 |
| 4,554,318 A | | 11/1985 | Rukavina | 525/118 |
| 4,609,703 A | | 9/1986 | Rukavina | 524/360 |
| 4,647,548 A | | 3/1987 | Klein | 501/134 |
| 5,471,338 A | * | 11/1995 | Yu et al. | 359/265 |
| 5,679,283 A | | 10/1997 | Tonar et al. | 252/583 |
| 5,776,548 A | | 7/1998 | Rukavina et al. | 748/188.2 |
| 5,818,625 A | * | 10/1998 | Forgette et al. | 359/267 |
| 5,838,483 A | * | 11/1998 | Teowee et al. | 359/265 |
| 5,840,429 A | | 11/1998 | Rukavina et al. | 428/412 |
| 5,994,452 A | | 11/1999 | Rukavina et al. | 524/590 |
| 6,154,306 A | * | 11/2000 | Varaprasad et al. | 359/265 |
| 6,166,848 A | * | 12/2000 | Cammenga et al. | 359/265 |
| 6,246,505 B1 | * | 6/2001 | Teowee et al. | 359/241 |

OTHER PUBLICATIONS

A.A.Karim; C.Deshpandey; H.J.Doerr; R.F.Bunshah;, Department of Materials Science And Engineering, UCLA, "Deposition Of Tin–Doped Indium Oxide Films By A Modified Reactive Magnetron Sputtering Process", *Thin Solid Films*, 172, (1989), pp. 111–121.

* cited by examiner

*Primary Examiner*—Timothy Thompson
(74) *Attorney, Agent, or Firm*—Andrew C. Siminerio

(57) ABSTRACT

An electrochromic device includes a first substrate having at least one polymeric surface; a primer layer along the polymeric surface; a first electrically conductive transparent coating along the primer of the first substrate, wherein the primer layer adheres the first electrically conductive coating to the polymeric surface of the first substrate; a second substrate spaced apart from the first substrate to define a chamber therebetween; a second electrically conductive transparent coating on a surface of the second substrate such that the first coating is in facing relation to the second coating, wherein at least one of the first and second substrates is transparent; and an electrochromic medium contained in the chamber, the electrochromic medium having reduced luminous transmittance upon application of electrical power to the first and second conductive coatings and establishing an electrical potential through the electrochromic medium, and wherein the electrochromic medium and the primer layer are compatible.

48 Claims, 1 Drawing Sheet

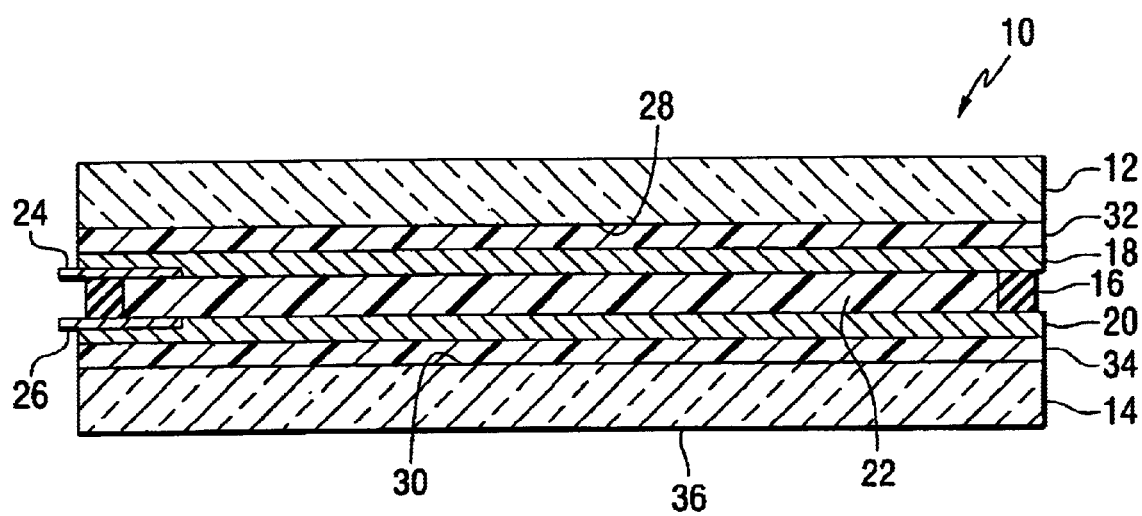

POLYMERIC ELECTROCHROMIC DEVICES

This application claims the benefit of U.S. Provisional Application No. 60/241,039 filed Oct. 17, 2000.

The present invention relates to electrochromic devices including polymeric substrate materials. More particularly, the present invention is directed to plastic electrochromic devices particularly useful as window transparencies and aircraft windows.

Electrochromic devices are well known in the art for use in various applications. Such electrochromic devices typically include a sealed chamber defined by two pieces of glass that are separated by a gap or space that contains an electrochromic medium. The electrochromic medium typically includes anodic compounds and cathodic compounds together in a solution. The glass substrates typically include transparent electrically conductive layers coated on facing surfaces of the glass and in contact with the electrochromic medium. The conductive layers on both glass substrates are connected to electronic circuitry. When the conductive layers are electrically energized, an applied potential is introduced into the chamber of the device, which electrically energizes the electrochromic medium and causes the medium to change color. For example, when the electrochromic medium is energized, it may begin to absorb light and darken.

Electrochromic devices are commonly used in rear-view mirror assemblies in automotive applications. In such uses, a photocell can be incorporated into the electrochromic cell to detect a change in light reflected by the mirror. When a specific level of light is reflected, for instance when lights are reflected at night, the photocell can activate to apply an electrical potential to the electrodes in the cell, thus causing the electrochemical medium to change color and create a darkening affect, thereby dimming the mirror to the lights.

While electrochromic devices are most commonly used in rear-view mirror assemblies, such devices have been proposed for use in other automotive applications, such as windshields and windows, as well as other window transparency applications, such as aircraft window assemblies and architectural windows. With such various applications for electrochromic devices, various substrate materials have been explored for use. For example, it has been suggested to incorporate plastic as a substrate material in such electrochromic assemblies. Such plastic substrates, however, pose unique problems for electrochromic assemblies that are not prevalent with glass substrates.

For example, electrically conductive coatings are typically inorganic-type materials, which can adhere well to glass substrates. Such coatings, however, when applied to a plastic substrate, are more prone to problems. Initial adhesion of the coating to the plastic substrate surface is a concern, as well as maintaining adhesion after prolonged use and cracking and splitting of the conductive coating on the surface of the substrate.

Copolymers of acrylic acid and cyanoethylacrylate have been used as primers for bonding metal coatings to plastic substrates, and a primer composition of a carbonate diol-based crosslinked polyurethane has been used for adhering metal oxide coatings to plastic substrates. The metal oxide coated plastic substrates are particularly useful in aircraft window transparencies, with the metal oxide coating being conductive to melt ice and remove moisture from the aircraft transparency.

Moreover, various polymeric materials are known for use as electrochromic medium in electrochromic devices. Such polymeric electrochromic medium can include solvents or other components, which can undesirably react with the substrate material, thereby posing problems for the electrochromic transparency assembly.

Application of electrically conductive coatings to plastic substrates for use in electrochromic devices poses problems in the coated transparency. For example, excellent conductive coatings can be achieved with thin film layers on substrates through high temperature deposition procedures involving, for example, temperatures of 500° C. Plastic substrates, however, cannot withstand exposure to such high temperatures for deposition. Thus, lower temperature deposition is necessary for plastic substrates, which results in film coatings having less conductivity. In order to increase the conductivity and improve uniformity in color switching, thicker films must be applied. When such thicker films are deposited however, they are more prone to defects in the film structure, e.g. cracking. Thus, when used in electrochromic devices, irregular conductive coatings are formed, which are undesirable. Also, any irregularities or cracks of the conductive film can expose the substrate material to attack from the electrochromic medium and the solvents employed therein.

Accordingly, a need exists for electrochromic devices that are constructed of plastic materials, which can be easily manufactured and which are resistant to undesirable cracking and failure.

The present invention provides an electrochromic device comprising: a first substrate having at least one polymeric surface; a primer layer along the polymeric surface; a first electrically conductive transparent coating along the primer of the first substrate, wherein the primer layer adheres the first electrically conductive coating to the polymeric surface of the first substrate; a second substrate spaced apart from the first substrate to define a chamber therebetween; a second electrically conductive transparent coating on a surface of the second substrate such that the first coating is in facing relation to the second coating, wherein at least one of the first and second substrates is transparent; and an electrochromic medium contained in the chamber, the electrochromic medium having reduced luminous transmittance upon application of electrical power to the first and second conductive coatings and establishing an electrical potential through the electrochromic medium, and wherein the electrochromic medium and the primer layer are compatible. In one nonlimiting embodiment of the invention, the substrates are plastic and/or transparent materials. In another nonlimiting embodiment, at least one of the first and second electrically conductive coatings is a two part coating comprising a first electrically conductive portion deposited from a metal cathode and a second electrically conductive portion deposited from a ceramic cathode.

The present invention also provides an electrochromic transparency comprising: first and second spaced apart transparent substrates defining a chamber therebetween, the first and the second substrates including first and second electrically conductive transparent coatings on respective facing surfaces thereof; and an electrochromic medium contained in the chamber, the electrochromic medium having reduced luminous transmittance upon application of electrical power to the first and second electrically conductive coatings to establish an electrical potential through the electrochromic medium, the electroconductive medium comprising an electrochromic solution dispersed in a polymeric matrix; wherein at least one of the first and the second substrates is plastic, and at least one of the first and second electrically conductive coatings is affixed to the plastic substrate through a transparent primer composition which is compatible with the electrochromic medium.

The present invention further provides an electrochromic device comprising: a first substrate having at least one polymeric surface; a primer layer along the polymeric surface; a first electrically transparent conductive coating along the primer of the first substrate, wherein the primer layer adheres the first electrically conductive coating to the polymeric surface of the first substrate; a second substrate spaced apart from the first substrate to define a chamber therebetween; a second electrically conductive transparent coating on a surface of the second substrate such that the first coating is in facing relation to the second coating, wherein at least one of the first and second substrates is transparent, wherein at least one of the first and second electrically conductive coatings is a two part coating comprising a first electrically conductive portion deposited from a metal cathode and a second electrically conductive portion deposited from a ceramic cathode; and an electrochromic medium contained in the chamber, the electrochromic medium having reduced luminous transmittance upon application of electrical power to the first and second conductive coatings and establishing an electrical potential through the electrochromic medium.

The present invention also provides a method for making an electrochromic device comprising: providing a first substrate having a polymeric surface; providing a primer layer along the polymeric surface; forming a first electrically conductive transparent coating on the primer layer of the first substrate; providing a second substrate, wherein at least one of the first and second substrates is transparent; forming a second electrically conductive transparent coating on a surface of the second substrate; spacing the first and the second substrates from each other such that the first electrically conductive coating and the second electrically conductive coating are in facing relationship to provide a chamber therebetween; and providing an electrochromic medium within the chamber, the electrochromic medium having reduced luminous transmittance upon application of electrical power to the first and second conductive coatings, wherein the primer layer and the electrochromic medium are compatible. In one nonlimiting embodiment, at least the first electrically conductive coating or the second electrically conductive coating comprises a two part coating comprising a first electrically conductive portion deposited from a metal cathode, and a second electrically conductive portion deposited from a ceramic cathode.

The present invention also provides a method for making an electrochromic device comprising: providing a first substrate having a polymeric surface; providing a primer layer along the polymeric surface; forming a first electrically conductive transparent coating on the primer layer of the first substrate; providing a second substrate, wherein at least one of the first and second substrates is transparent; forming a second electrically conductive transparent coating on a surface of the second substrate, wherein at least one of the first electrically conductive coating or the second electrically conductive coating comprises a two part coating comprising a first electrically conductive portion deposited from a metal cathode, and a second electrically conductive portion deposited from a ceramic cathode; spacing the first and the second substrates from each other such that the first electrically conductive coating and the second electrically conductive coating are in facing relationship to provide a chamber therebetween; and providing an electrochromic medium within the chamber, the electrochromic medium having reduced luminous transmittance upon application of electrical power to the first and second conductive coatings.

The foregoing summary, as well as the following detailed description of embodiments of the invention, will be better understood when read in conjunction with the appended drawing. In the drawing:

FIG. 1 represents a cross-sectional view of an electrochromic device in accordance with the present invention.

The present invention is directed to an electrochromic device incorporating two substrates, at least one of which is polymeric material substrate, e.g. a plastic material or a substrate having a polymeric surface. At least one of the substrates is transparent. An electrically conductive coating is adhered to each of the substrates and an electrochromic medium is provided between the two conductive coatings on the substrates. Upon applying electrical power to the coating, an electrical potential is established through the electrochromic medium. The electrochromic medium includes dyes that change color, thus changing the color of the medium, when the electrical potential is applied. The change in color changes the light transmittance of the medium. If desired, both the substrates can be transparent to form an electrochromic transparency such that the change in luminous transmittance of the medium will result in a change in the luminous transmittance of the electrochromic transparency. A primer composition is used to adhere the electrically conductive coating to the plastic substrate material or polymeric surface and prevent undesirable interaction between the electrochromic medium and the polymeric substrate and, thereby avoiding undesirable cracking of the conductive coating and the polymeric substrate.

As used herein, the terms "luminous transmittance" and "light transmittance" mean the measure of the total amount of visible light transmitted through a material, e.g. a substrate or a transparency. The luminous transmittance data provided in this specification is measured for CIE standard illuminant A. As used herein the term "plastic" means an organic, synthetic or processed material, generally thermoplastic or thermosetting polymers of high molecular weight, which can be molded, cast, extruded, drawn or laminated into objects, films or filaments (see *Webster's New Collegiate Dictionary* (1974)).

For the purposes of this specification, unless otherwise indicated, all numbers expressing quantities such as voltage, luminous transmittance, temperature, coating and substrate thickness, and so forth used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

An electrochromic device is depicted in FIG. 1. In the particular nonlimiting embodiment of the invention shown in FIG. 1, the electrochromic device is an electrochromic transparency 10. Electrochromic transparency 10 can be useful as any type of transparency known in the art. For example, electrochromic transparency 10 can be an automotive window transparency such as a windshield, a side window, a rear window or a sun roof; an architectural glazing such as a building window or skylight; or an aircraft transparency such as a cabin window or a cockpit window. It is contemplated that, while the present invention is discussed herein in terms of window assemblies, uses for other electrochromic assemblies are also contemplated, such as, but not limited to rear-view and side-view automotive mirrors, as will be discussed later in more detail.

Electrochromic transparency 10 includes first transparent substrate 12 and second transparent substrate 14. The substrates can be made of any material known in the art for use in electrochromic devices, such as but not limited to polymeric materials, glass materials and the like. At least one of first substrate 12 or second substrate 14 is made of a polymeric material or includes a polymeric coating thereon. Nonlimiting embodiments of such polymeric material substrates include a monolithic plastic or a laminate having a plastic surface. In the nonlimiting embodiment of the invention illustrated in FIG. 1, substrates 12 and 14 are shown as monolithic plastic plies. While the invention will be discussed herein with reference to a plastic substrate, as can be appreciated, the invention is not limited thereto, and in the practice of the invention, it is contemplated that any material can be used as substrate materials, so long as one of the substrates is a polymeric material or includes a polymeric surface layer. In embodiments of the invention wherein one of the substrates is a glass, the glass substrate can be a monolithic glass ply or a laminate that provides a glass surface.

In one nonlimiting embodiment of the present invention, one of the substrates is plastic and the other substrate is glass. For example, the outer substrate can be glass and the inner substrate can be plastic. Such an arrangement is particularly useful, for example, in automotive window applications, wherein the plastic inner substrate can prevent laceration from the glass substrate when the window is broken.

It should be further appreciated that by providing an electrochromic transparency 10 with at least one plastic substrate, significant weight reduction can be achieved. Such weight reduction is particularly desirable in window applications, such as automobile and aircraft window assemblies, where weight reduction plays a significant role in overall vehicle performance and efficiency.

In the electrochromic transparency 10 of the present invention, both first substrate 12 and second substrate 14 are transparent, i.e. have a luminous transmittance greater than 0%, for example are materials having a luminous transmittance of at least 10%. Additionally, one or both of first and second substrates 12 and 14 can be colored or tinted.

The plastic substrate of the electrochromic transparency 10 of the present invention can be any polymeric material capable of being formed into a substrate as discussed herein. Nonlimiting examples of polymeric materials useful as the substrate include polycarbonates, polyacrylics, urethane carbonate copolymers, polysulfones, polyimides, polyacrylates, polyurethanes, polyethers, polyesters, polyalkenes, polysulfides, polyimides and polyvinylacetates. Nonlimiting examples of useful polyester substrate material include polybutylene terephthalate and polyethylene terephthalate. A nonlimiting example of a useful polysulfide substrate material is polyphenylene sulfide. A nonlimiting example of a useful polyalkene substrate material is poly(4-methyl-1-pentene). Nonlimiting examples of useful polyacrylates substrate materials include polyalkylacrylates and polyalkyl(meth)acrylates, such as biaxially oriented crosslinked polymethylmethacrylate (also known as stretched acrylic), and cast acrylics. Nonlimiting examples of useful polycarbonate substrate materials include polycarbonate polyurethanes, bisphenol A polycarbonate, polyester polycarbonate and polyether polycarbonate. Another nonlimiting substrate example includes of CR-39® (monomers from PPG Industries, Inc. of Pittsburgh, Pa., which is a diethylene glycol bis(allyl carbonate).

As can be appreciated, the thickness of the substrates can vary over a broad range depending upon its application. Typically, a stretched acrylic substrate (as opposed to a laminate of more than one substrate material) has a thickness of 0.125 to 1 inch (3 to 25 millimeters) for many applications. A polycarbonate typically has a thickness of 0.001 to 1 inch (0.025 to 25 mm) for most applications. As can be appreciated, the invention is not limited to the thickness of the substrate and the substrate can be of any thickness.

Referring to FIG. 1, first substrate 12 and second substrate 14 are spaced-apart and in a substantially parallel facing relationship with respect to each other, defining a chamber therebetween. Such a relationship is preferably achieved through spacing element 16. Spacing element 16 can be positioned between the substrates in any manner capable of maintaining proper spacing and sealing between first substrate 12 and second substrate 14. In one nonlimiting embodiment of the present invention, spacing element 16 extends about the perimeter of electrochromic transparency 10 adjacent the outer edges of first substrate 12 and second substrate 14 in a sealing manner, as is known in the art. Although not required, in one nonlimiting embodiment, spacing element 16 can be positioned slightly inward from the outer edges of first substrate 12 and second substrate 14. Such positioning provides a slight overhang of the edge of the first and second substrates from the spacing element, which can expose a portion of first and second conductive coatings 18 and 20, discussed below, for improved electrical contact. Spacing element 16 can be constructed of any electrically insulating material, such as but not limited to a polymeric material. In one nonlimiting embodiment, spacing element 16 is a curable organic polymeric material, e.g. a thermoplastic, thermosetting or UV curing resin material. In another nonlimiting embodiment, spacing element 16 is an epoxy based organic sealing material.

Electrochromic medium 22 is contained within the chamber formed between first substrate 12 and second substrate 14. Electrochromic medium 22 can be any type of material as is known in the art, and can be in any known form, such as but not limited to electrochromic solutions, gels, semisolid materials, and the like. Electrochromic medium 22 includes a dye that defines a color. Such materials are well known in the art to color to successively darker colors or shades as larger voltages are applied to the transparency 10. In the nonlimiting embodiment of the present invention shown in FIG. 1, voltage is applied to electrically conductive coatings 18 and 20 through bus bars 24 and 26, which are positioned along at least a portion of the periphery of transparency 10 and make electrical connection with coatings 18 and 20, respectively. Bus bars 24 and 26 can be made of any highly conductive material typically used for bus bars and well known in the art. Nonlimiting examples of typical bus bar materials include metal foil, e.g. copper foil, metal coating, e.g. gold coatings, and conductive metal containing ceramic paints, e.g. silver ceramic paint.

In one nonlimiting embodiment of the present invention, such coloring between the applied and non-applied electrical states is self-erasable, that is the electrochromic medium 22 is switchable between an electrochemically activated state, wherein the electrochromic medium 22 colors upon application of the electrical potential, and an electrochemically non-activated state, wherein the electrochromic medium 22 automatically returns or erases to its colorless state when the electrical potential is removed.

In another nonlimiting embodiment, the electrochromic medium 22 is switchable and non-self-erasing, such that application of the electrical potential causes the electrochromic medium to color, and the electrochromic medium will remain in the colored state until the electrical potential is reversed.

In one nonlimiting embodiment of the present invention, electrochromic medium 22 is a solution-phase type electrochromic medium, in which a material contained in solution in an ionically conducting electrolyte remains in solution in the electrolyte when electrochemically reduced or oxidized (including a gel). In another nonlimiting embodiment, electrochromic medium 22 is a surface-confined electrochromic medium, in which a material which is attached directly to an electronically conducting electrode or confined in close proximity thereto remains attached or confined when electrochemically reduced or oxidized. In still another nonlimiting embodiment, electrochromic medium 22 is an electrodeposition-type electrochromic medium, in which a material contained in solution in the ionically conducting electrolyte forms a layer on the electronically conducting electrode when electrochemically reduced or oxidized.

Although not required, electrochromic medium 22 can include at least two compounds, including at least one anodic electrochromic compound and at least one cathodic electrochromic compound, with the anodic compound representing an oxidizable material and the cathodic compound representing a reducible material. Upon application of electrical potential through the electrochromic medium, the anodic electrochromic compound oxidizes and the cathodic electrochromic compound simultaneously reduces. Such simultaneous oxidation and reduction results in a change in the absorption coefficient at at least one wavelength in the visible spectrum. The combination of such anodic and cathodic electrochromic compounds in electrochromic medium 22 defines the color associated therewith upon application of electrical potential. As is well known in the art, such cathodic electrochromic compounds are commonly referred to as viologen dyes, and such anodic electrochromic compounds are commonly referred to as phenazine dyes.

Electrochromic medium 22 can also include other materials such as solvents, light absorbers, light stabilizers, thermal stabilizers, antioxidants, thickeners, viscosity modifiers and similar materials.

The solvent used in the electrochromic medium can be any useful solvent as is known in the art. Nonlimiting examples of useful solvent include a cyclic ester, such as propylene carbonate, isobutylene carbonate, γ-butyrolactone, δ-valerolactone, and mixtures thereof. In one nonlimiting embodiment, the solvent is propylene carbonate.

In one nonlimiting embodiment of the present invention, electrochromic medium 22 includes an electrochromic solution that comprises an anodic electrochromic compound and a cathodic electrochromic compound, interspersed in a polymer matrix. Such a polymer matrix can be any type of polymer matrix known in the electrochromic art. Such polymer matrices typically involve polymers having reactive functional groups that are covalently crosslinked to form a bridged compound. Although not required, such polymer matrix can be formed by crosslinking polyols with compounds having isocyanate groups, thereby forming a polyurethane polymeric matrix. Nonlimiting examples of electrochromic solutions dispersed in such polymeric matrices are disclosed in U.S. Pat. No. 5,679,283, which is hereby incorporated herein by reference.

First substrate 12 and second substrate 14 are each provided with a layer of a electrically conductive material on facing surfaces thereof. More specifically, a first electrically conductive coating 18 is positioned along surface 28 of first substrate 12 and a second electrically conductive coating 20 is positioned along surface 30 of second substrate 14 such that coatings 18 and 20 are in facing relationship to each other, i.e. the coatings are along the inside surfaces of the chamber formed by substrates 12 and 14. First and second conductive coatings 18 and 20 can be any material that bonds well to the substrate surfaces; is resistant to corrosion by any materials within the electrochromic device as well as the atmosphere; and has good electrical conductance. In addition, in the embodiment of the invention wherein the electrochromic device is a transparency, coatings 18 and 20 are also substantially transparent to visible light. First and second conductive coatings 18 and 20 can be constructed from the same or different materials, including, for example, tin oxide, indium tin oxide (ITO), fluorine doped tin oxide (FTO), antimony doped tin oxide, ITO/metal/ITO (IMI), as well as any other materials known in the art.

Conductive coatings 18 and 20 can be applied by any of several well known methods, including pyrolysis, chemical vapor deposition and magnetron sputter vacuum deposition (MSVD). First and second conductive coatings 18 and 20 can be constructed from the same or different materials. Without limiting the present invention, coated substrates useful in the present invention include an electrically conductive fluorine doped tin oxide coated glass available from PPG Industries, Inc. of Pittsburgh, Pa. and marketed under the trademark NESA®, and an electrically conductive indium tin oxide coated glass available from PPG Industries, Inc. and marketed under the trademark NESATRON®.

It should be appreciated that some deposition techniques cannot be used on a polymeric surfaces or substrates. More particularly, deposition techniques that require high temperatures generally cannot be used to coat polymeric substrates because the elevated temperature will melt or otherwise distress the substrate. The temperature at which a polymeric substrate can be coated without adversely affecting the substrate will depend on the substrate material. It is expected that pyrolysis coating techniques cannot be used to coat a polymeric substrate.

In one nonlimiting embodiment of the present invention, first and second conductive coatings 18 and 20 have a sheet resistance ranging from 1 and 10 ohms per square, for example ranging from 2 to 5 ohms per square. Further, the thickness of first and second conductive coatings 18 and 20 can be the same or different relative to each other and the coating thickness can be uniform or nonuniform. Although not required, in one nonlimiting embodiment of the present invention, the first and second conductive coatings 18 and 20 are the same coating material and have substantially the same uniform thickness ranging from 300 Å and 30,000 Å, for example ranging from 1000 Å and 28,000 Å.

Affixing such conductive coatings to glass surfaces is typically accomplished through magnetic sputtering deposition processes, which are well known in the art. When deposited on a polymeric substrate or substrates coated with a polymeric surface, such deposition processes typically require thick films in order to achieve good conductivity of the film surface. Such thicker films, however, are more prone to cracking.

Although not required, in order to improve the adhesion between conductive coatings on the surface of a plastic substrate (or substrates including a polymeric coating or layer), a primer composition can be used between conductive coatings and the substrates. For example, in a nonlimiting embodiment wherein substrates 12 and 14 are both plastic, a first primer layer 32 can be positioned along surface 24 between first coating 18 and first substrate 12, and a second primer layer 34 can be positioned along surface 26 between second coating 20 and second substrate 14, as shown in FIG. 1. Any known primer composition can be used as primer layers to adhere the conductive coating layer to the plastic substrate. In addition, in the particular embodiment of the invention wherein the electrochromic device is a transparency, primer layers 32 and 34 are also substantially transparent to visible light.

It should be appreciated that the electrochromic medium and the plastic substrate can include materials that interact with each other in a manner that adversely effects the appearance and/or performance of the transparency 10. For example, the electrochromic medium can include a solvent and/or polymeric matrix that is reactive with the plastic substrate. Such solvent and/or polymeric matrix can cause the plastic substrate to swell or crack, causing undesirable properties for the electrochromic assembly, such as haze, and can further crack the conductive coatings of the transparency. In order to prevent such an occurrence, in one nonlimiting embodiment of the invention, the electrochromic medium and the primer composition are compatible. As used herein, the phrase "the electrochromic medium and the primer composition are compatible" and "the electrochromic medium is compatible with the primer material" means that the constituents of the electrochromic medium and the primer composition do not interact with each other in a manner that deleteriously effects the appearance of the transparency 10, e.g. cracking and hazing, and/or the performance of the transparency 10, e.g. optical distortion, defects and reduction in the amount of change in the luminous transmittance of the transparency 10 between its energized and unenergized states. More specifically, in this particular embodiment, the primer layer functions as a barrier layer that prevents the electrochromic medium from contacting the plastic substrate and remains relatively nonreactive with the electrochromic medium. Thus, the primer composition aids in adhering the conductive coating to the substrate and helps prevent undesirable interaction within the transparency 10.

Without limiting the present invention, primer compositions that are compatible with the electrochromic medium can be selected from acrylates, polyurethanes, urethane acrylates, epoxies, epoxy acrylate, zirconium silicates, and mixtures thereof. In several nonlimiting embodiments, the primer composition can be (a) a polyurethane composition, such as a carbonate diol-based crosslinked polyurethane; (b) an acrylic composition, such as copolymers and terpolymers of alkylacrylates and acrylic acid including (i) copolymers of cyanoethylacrylate and acrylic acid, (ii) copolymers of 2-ethylhexylacrylate and acrylic acid, (iii) terpolymers of cyanoethylacrylate, hydroxyethylacrylate and acrylic acid; and (iv) terpolymers of cyanoethylacrylate, 2-ethylhexylacrylate and acrylic acid, or (c) a zirconium silicate such as terpolymers of zirconium alkoxide, colloidal silica and acrylate silane. Examples of such primer compositions include those compositions disclosed in U.S. Pat. Nos. 4,554,318; 4,609,703; 5,776,548 and 5,994,452, each of which is incorporated herein by reference.

Another nonlimiting primer for a plastic layer or substrate is $SiO_x$. For example and without limiting the present invention, a 100 to 400 angstrom thick layer of $SiO_x$ would promote adhesion of a transparent coating of the type disclosed earlier The SiOx layer would also function as a barrier to resist gases and liquid solvents deposited over the coating which are capable of penetrating through the coating and prevent swelling or penetration of the underlying plastic surface.

Since the primer composition can also include a polymeric material, undesirable interaction can also occur with the plastic substrate. Thus, in one nonlimiting embodiment the primer composition is compatible with the electrochromic medium as well as the plastic substrate, to prevent undesirable interactions within the transparency. For example, the primer composition should be resistant to solvents used in the plastic substrate.

In one nonlimiting embodiment of the present invention, at least one of the substrates is a polycarbonate ply, the electrochromic medium includes a propylene carbonate solvent, and the primer is a carbonate diol based cross-linked polyurethane.

Coatings useful in the present invention can be deposited using a metal cathode or a ceramic cathode, as is well known in the coating art. Conductive coatings which are deposited through deposition procedures involving a metal alloy cathode typically include a morphology that allows organic solvent to pass through the coating. In doing so, the organic solvents can chemically attack the primer coating and/or the plastic substrate, causing swelling, expansion, and eventual cracking of the conductive coating.

Conductive coatings which are deposited through deposition procedures involving a ceramic cathode typically include high crystallinity and high modulus, as compared with conductive coatings deposited from a metal cathode at the same temperature and thickness. Such conductive coatings deposited from a ceramic cathode therefore are less porous and have improved chemical resistance as compared with conductive coatings deposited from a metal cathode. When applied to plastic substrates, however, the thickness of conductive coatings deposited from a ceramic cathode must be controlled in order to minimize the compressive stress on the plastic substrate.

More specifically, the compressive stress of conductive coatings is directly related to the thickness of the coating, and depends, in part, upon the deposition temperature, the coefficient of expansion differences between the substrate and the conductive coating, the thickness of the coating, the crystallinity of the coating, and the elastic modulus of the coating. Thus, while conductive coatings deposited from a ceramic cathode have greater crystallinity and higher modulus as compared with conductive coatings deposited from a metal cathode at the same temperature and thickness, such conductive coatings also have a compressive stress which is much higher, for example on the order of three times higher, than conductive coatings deposited from a metal cathode at the same temperature and thickness. This higher compressive stress can result in cracking and buckling of the conductive coating and further causes the conductive coating to separate from the substrate material and the primer. The cracking further allows the electrochromic medium to contact and potentially interact with the primer layer and/or polymeric substrate, which in turn can result in swelling of the substrate and further degrading of the coating. Thus, in order to minimize the stress on the coating when used with plastic substrates, the thickness of the conductive coating deposited from a ceramic cathode must be limited. With such a limited thickness, however, appropriate conductivity may not be achieved. To avoid this problem, in one nonlimiting embodiment of the invention, the electrically conductive coating is a two-part coating including a first portion deposited from a metal cathode, and a second portion deposited from a ceramic cathode with a coating thickness sufficient to protect any underlying layers. The composite coating can provide the desired electrical conductivity characteristics required of the transparency as well as function as a barrier layer that prevents chemical attack of an underlying layer, i.e. the primer layer or the polymeric surface of the substrate.

The first and second portions of the conductive coatings as discussed above can be provided in any order. For example, the conductive coating can include a first portion, which is deposited from a metal cathode directly on the substrate material or primer composition as discussed earlier, and a second portion, which is deposited from a ceramic cathode directly on the first portion so that it can be in contact with the electrochromic medium. Alternatively, the conductive coating can include a first portion, which is deposited from a ceramic cathode directly on the substrate material or primer composition, and a second portion, which is deposited from a metal cathode on the first portion so that it can be in contact with the electrochromic medium. However, if there is concern over an adverse chemical interaction between the metal cathode deposited coating and the electrochromic medium, the metal cathode deposited coating should be deposited first so that the ceramic cathode deposited coating can offer some protection to the first coating.

In one nonlimiting embodiment of the present invention, the portion of the conductive coating that is deposited from a ceramic cathode has a thickness ranging from 100 Å to 1000 Å.

Additionally, conductive coatings are prone to cracking in a tensile mode at 0.5% inches/inch of strain, i.e. the coating can expand only 0.5% before it begins to crack. As such, very little swelling of the primer composition can cause an expansion and subsequent cracking of the conductive coating. Chemical attack of the primer composition can be further reduced by ensuring that the crosslink density of the primer composition is sufficiently high to prevent any swelling by any solvents which may penetrate the conductive coating. In one nonlimiting embodiment of the present invention, the crosslink density of the primer composition is below a molecular weight per crosslink of 500 grams/mole.

Thus in one nonlimiting embodiment of the present invention, the transparency includes at least one polymeric substrate and primer layers compatible with the electrochromic medium in combination with single layer or multilayered electrically conductive coatings. In another nonlimiting embodiment of the present invention, the transparency includes at least one polymeric substrate and multilayered electrically conductive coatings configured to prevent the electrochromic medium from contacting the polymeric substrate. In still another nonlimiting embodiment of the present invention, the transparency includes at least one polymeric substrate and multilayered electrically conductive coatings configured to prevent the electrochromic medium from contacting the polymeric substrate in combination with primer compositions compatible with the electrochromic medium.

The present invention will now be described in terms of a nonlimiting method of manufacture. In this method, first and second substrates are provided, with at least one of these substrates being polymeric, e.g. plastic or including a polymeric layer or coating thereon. In one nonlimiting embodiment, both the first and second substrates are plastic material.

The substrates are each provided with a coating of a primer composition on one surface thereof. The primer composition can be applied to each substrate surface by any known technique, for example by spray coating. It should be appreciated that the different application techniques can be used for each primer coating and further that the type of substrate can dictate the type of coating application techniques that can be used.

Thereafter, the first and second substrates are provided with first and second electrically conductive coatings, respectively, on their primed surface. The coatings can be single layer coatings applied by magnetic sputtering vapor deposition techniques, or the coatings can be multilayered coatings as discussed earlier. More specifically, each of the first and second coatings can include a first conductive portion deposited on the substrate using a metal cathode and a second conductive portion deposited over the first conductive portion using a ceramic cathode. The conductive coating is thereby formed as an integrated or composite-type conductive coating as discussed earlier. As an alternative, the first conductive portion can be deposited using a ceramic cathode and the second conductive portion can be deposited over the first conductive portion using a metal cathode.

The first and second substrates, including the conductive coatings on respective surfaces thereof, are spaced from each other with the first conductive coating of the first substrate in facing relationship with the second conductive coating of the second substrate. During manufacture, the first and second substrates can be held in such spaced-apart, facing relation in any known manner, such as through a frame. A spacer element is provided between the first and second spaced substrates about at least a portion of their perimeter. In one nonlimiting embodiment, a crosslinkable material is positioned between the first and second substrates about the edge thereof to provide the desired spacing.

An electrochromic medium capable of reduced luminous transmittance upon application of electrical power to the first and second conductive coatings is provided between the first and second substrates, for example by injecting the electrochromic medium through the spacer material and in between the substrates. The electrochromic medium is then cured, for example by heating.

Facilities, for example bus bars 24 and 26, are provided in contact with the first and second conductive coatings, respectively. For example, an anodic bus bar can be provided in contact with the first conductive coating, and a cathodic bus bar can be provided in contact with the second conductive coating. Lead wires (not shown) are provided for connecting each of the bus bars to a source of electrical current. Upon application of power to the bus bars, an electrical potential is established through the electrochromic medium such that the electrochromic medium changes color, thereby reducing luminous transmittance through the electrochromic transparency.

Although the electrochromic device of the present invention has been discussed above in terms of an electrochromic transparency 10 incorporating transparent substrates, primers and electrically conductive coatings, in another nonlimiting embodiment of the invention the electrochromic device is not transparent so that one or more of these elements do not need to be transparent. For example and without limiting the present invention, the electrochromic device can be an electrochromic mirror that incorporates an opaque reflective coating (not shown) along surface 30 or 36 of substrate 14. Such reflective coatings are well know to those skilled in the art and nonlimiting examples of such coatings can include silver and/or chrome. In this configuration, the darkening of the electrochromic medium 22 will darken the reflection off the reflective coating, as discussed earlier. It should be appreciated that in the embodiment of the invention where the reflective coating is along surface 30 of substrate 14, the coating could be positioned between substrate 14 and conductive coating 20 (allowing substrate 14 to be opaque) or between substrate 14 and primer layer 34 (allowing substrate 14 to be opaque) or between primer layer 34 and conductive coating 20 (allowing both substrate 14 and primer 34 to be opaque). It should be further appreciated that in this particular embodiment where the reflective coating is along surface 30 of substrate 14, the opaque substrate can be, for example, metal or a polymeric material.

The invention will now be described through the following examples, which are exemplary of the present invention, and are not intended to limit the scope thereof.

EXAMPLE 1

A primer composition was prepared as follows: a cyanoethyacrylate/acrylic acid oligomer was prepared in cyclohexanone at 25% solids. A crosslinking agent, 2-(3,4-epoxycyclohexyl-5,5-spiro-3,4-epoxy) cyclohexane-metadioxane, was added to react at least 50% of the carboxylic acid groups. Dibutyltindilaurate was added as a catalyst.

The solution, as prepared, was applied to one surface of a stretched acrylic plastic and cured at 190° F. (88° C.). The plastic substrate including the primer composition on one surface thereof, was put into a vacuum chamber and an indium tin oxide (ITO) coating was sputtered onto the primed surface from a metal cathode to achieve a resistance of 10 ohm/square.

This procedure was repeated for a second substrate.

An electrochromic device is fabricated from the two plies of ITO coated stretched acrylic plastic substrates. More specifically, a solution of xylene viologen perchlorate, dimethylphenazine, tetrabutylammonium tetrafluoroborate, propylene carbonate, and a polyether polyurethane thermoplastic was provided between the two substrates as an electrochromic medium for the electrochromic device.

Upon application of a 1.0 volt electrical potential to the ITO conductive coatings, the device switched from 65% to 1% light transmittance. The device was then stored for 3 months and retested. Although the device exhibited a similar range of light transmittance, small cracks emanating from pinholes in the ITO conductive coatings were observed.

EXAMPLE 2

A primer composition was prepared from 0.1 equivalents of carbonate diol, solid as KM-1667 from Stahl Corp., 0.9 equivalents of trimethylol propane, and 1.0 equivalents sold as polyisocyanate Mondur MR from Bayer Corp. The final solution was 10% solids in diacetone alcohol.

The solution, as prepared, was applied to one surface of two substrates of Lexan® polycarbonate sold by G.E. Corp, and cured at 230° F. (110° C.) for 4 hours. The substrates, as primed, were placed in a vacuum chamber, and a conductive coating of 3–10 ohm/square ITO was then sputtered onto the primed surface of each substrate from a metal cathode.

An electrochromic device, as described in Example 1, was fabricated from the two coated substrates. When a 1.0 volt potential was applied, the device switched from 67% to 0.2% light transmittance. The device was then stored for 2 months and retested. Although the device exhibited a similar range of light transmittance, small cracks appeared in the ITO conductive coatings.

EXAMPLE 3

A primer composition for stretched acrylic and Plexiglas® acrylic sheet made from a methylmethacrylate/acrylic acid copolymer was prepared at 25% solids in cyclohexanone. A cycloaliphatic diepoxide was added to react at least 50% of the carboxylic acid groups. A final solution of 10% solids was prepared.

The primer composition, as prepared, was applied to the a surface of the stretched acrylic and Plexiglas acrylic sheet substrates and cured at a temperature below 195° F. (91° C.). A conductive coating of 3 ohm/square ITO was applied to each primed surface via magnetron sputtering from a metal cathode.

Electrochromic devices, such as described in Example 1, were fabricated from the stretched acrylic substrates and the Plexiglas substrates, as prepared. Upon application of 1 volt electrical potential to the conductive coatings, the devices switched from 62% to 0.1% light transmittance. The devices were then stored for 3 months and retested. Although the devices exhibited a similar range of light transmittance, small crazes and large cracks appeared in the ITO conductive coatings.

EXAMPLE 4

The primer, as prepared in Example 1, was applied to stretched acrylic and cured at 190° F. A 500 Å layer of ITO applied from a ceramic cathode was applied to the primed surface. Over top of this layer, ITO was applied from a metal cathode until the resistance of the total coating reached 2 ohms/square. This procedure is repeated for a second stretched acrylic substrate.

An electrochromic device as described in Example 1 was fabricated from the substrates. The device switched from 65% to 0.5% light transmittance upon application of 1.0 volts. After 3 months, and the switching range remained the same.

The device was then stored for 3 months and retested. The device exhibited a similar range of light transmittance and no cracks were evident in the ITO coatings.

EXAMPLE 5

The primer composition of Example 1 was applied to two Plexiglas acrylic sheet substrates and cured at 190° F. An ITO coating was deposited on the primed surfaces of the substrates from a metal cathode until the coating resistance was 2 ohms/square. Overtop of this coating, a 500 Å layer of ITO was deposited from a ceramic cathode.

An electrochromic device was fabricated according to Example 1 incorporating the coated substrates. The device switched from 64% to 0.5% light transmittance upon application of 1.0 volts electrical potential to the conductive coatings. The device was then stored for 3 months and retested. The switching range remained constant and no cracks were detected in the ITO coatings.

EXAMPLE 6

The primer composition of Example 2 was applied to two Lexane® polycarbonate substrates and cured at 230° F. An 800 Å layer of ITO was applied from a ceramic cathode over each primed surface. Over top of these layers, an ITO layer was deposited from a metal cathode until the total coating resistance was 5 ohms/square.

An electrochromic device was fabricated according to Example 1 incorporating the coated substrates. The device switched from 68% to 2% light transmittance upon application of a 1 volt electrical potential to the conductive coatings. The device was then stored for 4 months and retested. No cracks were observed in the ITO coating and the switching range did not change.

EXAMPLE 7

The primer composition of Example 2 was applied to two Lexan polycarbonate substrates and cured at 230° F. An ITO layer was applied on each primed surface from a metal cathode until the coating resistance was 2 ohms/square. A second ITO layer ranging from 200 to 1000 angstroms thick was deposited overtop the first layer from a ceramic cathode. The thickness of the second layer was varied to study effectiveness of different top coating thicknesses.

An electrochromic device was fabricated according to Example 1 incorporating the coated substrates. The device switched from 62% to 0.2% light transmittance upon application of 1.0 volt electrical potential to the conductive coatings. The device was then stored for 4 months and retested. No cracks were observed in the ITO coatings and the switching range was unchanged.

Example embodiments of the present invention have now been described. It will be appreciated that these examples are merely illustrative of the invention. Many variations and modifications of the invention will be apparent to those skilled in the art are intended to be included within the scope of the following claims.

What is claimed is:

1. An electrochromic transparency comprising:
   first and second spaced apart transparent substrates defining a chamber there between, said first and said second substrates including first and second electrically conductive transparent coatings on respective facing surfaces thereof; and
   an electrochromic medium contained in said chamber, said electrochromic medium having reduced luminous transmittance upon application of electrical power to said first and second electrically conductive coatings to establish an electrical potential through said electrochromic medium, said electroconductive medium comprising an electrochromic solution dispersed in a polymeric matrix;
   wherein at least one of said first and said second substrates is plastic, and at least one of said first and second electrically conductive coatings is affixed to said plastic substrate through a transparent primer composition which is compatible with said electrochromic medium.

2. The electrochromic transparency as in claim 1, wherein said plastic substrate is selected from polycarbonates, polyacrylics, polyurethanes, urethane carbonate copolymers, polysulfones, polyimides, polyacrylates, polyethers, polyester, polyalkenes, polyimides, polysulfides and polyvinylacetates, and said primer composition is selected from acrylates, polyurethanes, urethane acrylates, epoxies, epoxy acrylates, zirconium silicates, and $SiO_x$, and mixtures thereof.

3. The electrochromic transparency as in claim 2, wherein said electrochromic medium comprises at least two compounds comprising at least one anodic electrochromic compound and at least one cathodic electrochromic compound, and wherein application of electrical potential to said electrochromic medium causes simultaneous oxidation of said anodic electrochromic compound and reduction of said cathodic electrochromic compound, thereby causing reduced luminous transmittance.

4. The electrochromic transparency as in claim 3, wherein at least one of said electrically conductive coatings is selected from tin oxide, indium tin oxide, fluorine doped tin oxide, antimony doped tin oxide, IMI, and mixtures thereof.

5. An electrochromic device comprising:
   a first substrate having at least one polymeric surface;
   a primer layer along said polymeric surface;
   a first electrically conductive transparent coating along said primer of said first substrate, wherein said primer layer adheres said first electrically conductive coating to said polymeric surface of said first substrate;
   a second substrate spaced apart from the first substrate to define a chamber there between;
   a second electrically conductive transparent coating on a surface of said second substrate such that said first coating is in facing relation to said second coating, wherein at least one of said first and second substrates is transparent, wherein at least one of said first and second electrically conductive coatings is a two part coating comprising a first electrically conductive portion deposited from a metal cathode and a second electrically conductive portion deposited from a ceramic cathode; and
   an electrochromic medium contained in said chamber, said electrochromic medium having reduced luminous transmittance upon application of electrical power to said first and second conductive coatings and establishing an electrical potential through said electrochromic medium.

6. The electrochromic device as in claim 5, wherein said primer layer is compatible with said electrochromic medium.

7. A method for making an electrochromic device comprising:
   providing a first substrate having a polymeric surface;
   providing a primer layer along said polymeric surface;
   forming a first electrically conductive transparent coating on said primer layer of said first substrate;
   providing a second substrate, wherein at least one of said first and second substrates is transparent;
   forming a second electrically conductive transparent coating on a surface of said second substrate, wherein at least one of said first electrically conductive coating or said second electrically conductive coating comprises a two part coating comprising a first electrically conductive portion deposited from a metal cathode, and a second electrically conductive portion deposited from a ceramic cathode;
   spacing said first and said second substrates from each other such that said first electrically conductive coating and said second electrically conductive coating are in facing relationship to provide a chamber there between; and
   providing an electrochromic medium within said chamber, said electrochromic medium having reduced luminous transmittance upon application of electrical power to said first and second conductive coatings.

8. The method according to claim 7, wherein said primer layer is compatible with said electrochromic medium.

9. An electrochromic device comprising:
   a first substrate having at least one polymeric surface;
   a primer layer along said polymeric surface;
   a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent;

a highly reflective, opaque coating along a surface of one of said first or second substrates; and an electrochromic medium contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

10. An electrochromic device comprising:

a first substrate selected from polyurethanes, urethane carbonate copolymers, polysulfones, polyimides, polyester, polyethers, polyalkenes, polysulfides and polyvinylacetates;

a primer layer along a major surface of said first substrate;

a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent; and an electrochromic medium contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

11. The electrochromic device as in claim 10, wherein said primer layer is selected from acrylates, polyurethanes, urethane acrylates, epoxies, epoxy acrylates, zirconium silicates, and $SiO_x$, and mixtures thereof, and each of said first and second electrically conductive coatings is selected from tin oxide, indium tin oxide, fluorine doped tin oxide, antimony doped tin oxide, IMI and mixtures thereof.

12. An electrochromic device comprising:

a first substrate selected from polycarbonate urethane and polyester carbonate;

a primer layer along a major surface of said first substrate;

a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent; and an electrochromic medium contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

13. An electrochromic device comprising:

a first substrate having at least one polymeric surface;

a primer layer along said polymeric surface;

a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent and each one of said first and second electrically conductive coatings is selected from antimony doped tin oxide, IMI and mixtures thereof; and an electrochromic medium contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

14. The electrochromic device as in claim 13, wherein said primer layer is selected from acrylates, polyurethanes, urethane acrylates, epoxies, epoxy acrylates, zirconium silicates and $SiO_x$, and mixtures thereof.

15. An electrochromic device comprising:

a first substrate having at least one polymeric surface;

a primer layer along said polymeric surface, wherein said primer layer is selected from polyurethanes, urethane acrylates, and zirconium silicates and mixtures thereof;

a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent; and an electrochromic medium contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

16. The electrochromic device as in claim 15, wherein each of said first and second electrically conductive coatings is selected from tin oxide, indium tin oxide, fluorine doped tin oxide, antimony doped tin oxide, IMI and mixtures thereof.

17. An electrochromic device comprising:

a first substrate having at least one polymeric surface;

a primer layer along said polymeric surface, wherein said primer layer is selected from a carbonate diol-based cross linked polyurethane; a terpolymer of cyanoethylacrylate, hydroxyethylacrylate and acrylic acid; a terpolymer of cyanoethylacrylate, 2-ethylhexylacrylate and acrylic acid; and a terpolymer of zirconium alkoxide, colloidal silica and acrylate silane;

a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent; and an electrochromic medium contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

18. An electrochromic device comprising:

a first substrate having at least one polymeric surface;

a primer layer along said polymeric surface, wherein said primer layer comprises a carbonate diol-based cross linked polyurethane;

a first electrically conductive transparent coating along said primer of said first substrate, wherein said primer layer adheres said first electrically conductive coating to said polymeric surface of said first substrate;

a second substrate spaced apart from the first substrate to define a chamber there between;

a second electrically conductive transparent coating on a surface of said second substrate such that said first coating is in facing relation to said second coating, wherein at least one of said first and second substrates is transparent; and an electrochromic medium comprising a polyurethane contained in said chamber, said electrochromic medium having reduced luminous transmittance upon application of electrical power to said first and second conductive coatings and establishing an electrical potential through said electrochromic medium, and wherein said electrochromic medium and said primer layer are compatible.

19. The electrochromic device as in claim 10 wherein the electrochromic medium comprises at least one electrochromic medium selected from the group of electrochromic solutions, electrochromic gels and electrochromic semi-solid materials and portions of the electrochromic medium contact at least one of the primers through cracks in the electroconductive film between the at least one primer and the electrochromic medium.

20. The electrochromic device as in claim 12 wherein the electrochromic medium comprises at least one electrochromic medium selected from the group of electrochromic solutions, electrochromic gels and electrochromic semi-solid materials.

21. The electrochromic device as in claim 20 wherein portions of the electrochromic medium contact at least one of the primers through cracks in the electroconductive film between the at least one primer and the electrochromic medium.

22. The electrochromic device as in claim 5, wherein said first substrate is a plastic material.

23. The electrochromic device as in claim 5, wherein said first and second substrates are transparent and said primer layer is transparent.

24. The electrochromic device as in claim 5, wherein said first and second substrates are transparent plastic material and said primer layer is a first transparent primer layer, and further comprising a second transparent primer layer positioned between said surface of said second substrate and said second electrically conductive coating to adhere said second electrically conductive coating to said second substrate, said second primer layer being compatible with said electrochromic medium.

25. The electrochromic device as in claim 5, wherein said primer layer is selected from acrylates, polyurethanes, urethane acrylates, epoxies, epoxy acrylates and zirconium silicates and mixtures thereof.

26. The electrochromic device as in claim 5, wherein said primer layer is selected from a carbonate diol-based cross linked polyurethane, a copolymer of cyanoethylacrylate and acrylic acid; a copolymer of 2-ethylhexylacrylate and acrylic acid; a terpolymer of cyanoethylacrylate, hydroxyethylacrylate and acrylic acid; a terpolymer of cyanoethylpcrylate, 2-ethylhexylacrylate and acrylic acid; and a terpolymer of zirconium alkoxide, colloidal silica and acrylate silane.

27. The electrochromic device as in claim 5, wherein said primer layer comprises a carbonate diol-based cross linked polyurethane and said electrochromic medium comprises a polyurethane.

28. The electrochromic device as in claim 5, wherein said electrochromic medium comprises at least two compounds comprising at least one anodic electrochromic compound and at least one cathodic electrochromic compound, and wherein application of electrical potential through said electrochromic medium causes simultaneous oxidation of said anodic electrochromic compound and reduction of said cathodic electrochromic compound, thereby causing reduced luminous transmittance.

29. The electrochromic device as in claim 9, wherein each of said first and second electrically conductive coatings is selected from tin oxide, indium tin oxide, fluorine doped tin oxide, antimony doped tin oxide, IMI, and mixtures thereof.

30. The electrochromic device as in claim 5, wherein both of said first and second electrically conductive coatings are a two part coating comprising a first electrically conductive portion deposited from a metal cathode and a second electrically conductive portion deposited from a ceramic cathode.

31. The electrochromic device as in claim 5, wherein each of said first and second electrically conductive coatings is selected from tin oxide, indium tin oxide, fluorine doped tin oxide, antimony doped tin oxide, IMI, and mixtures thereof.

32. The electrochromic device as in claim 9, wherein said plastic material is selected from polycarbonates, polyacrylics, polyurethanes, urethane carbonate copolymers, polysulfones, polyimides, polyacrylates, polyester, polyethers, polyalkenes, polyimides, polysulfides and polyvinylacetates; said primer layer is selected from acrylates, polyurethanes, urethane acrylates, epoxies, epoxy acrylates and zirconium silicates and mixtures thereof, and each of said first and second electrically conductive coatings is selected from tin oxide, indium tin oxide, fluorine doped tin oxide, antimony doped tin oxide, IMI and mixtures thereof.

33. The electrochromic device as in claim 9, wherein said opaque coating is positioned between said first or second substrate and said corresponding first or second electrically conductive coating.

34. The electrochromic device as in claim 9, wherein said first or second substrate is positioned between said opaque coating and said corresponding first or second electrically conductive coating.

35. The method according to claim 7, wherein said first substrate is plastic.

36. The method according to claim 7, wherein both said first and second substrates are plastic, and further comprising applying a primer material that is compatible with said electrochromic medium between said surface of said second substrate and said second electrically conductive coating.

37. The electrochromic device as in claim 22, wherein said first and second substrates are transparent and said primer layer is transparent.

38. The electrochromic device as in claim 22, wherein said second substrate is a plastic material.

39. The electrochromic device as in claim 22, wherein said plastic material is selected from polycarbonates, polyacrylics, polyurethanes, urethane carbonate copolymers, polysulfones, polyimides, polyacrylates, polyester, polyethers, polyalkenes, polyimides, polysulfides and polyvinylacetates.

40. The electrochromic device as in claim 39, wherein said primer layer is selected from acrylates, polyurethanes, urethane acrylates, epoxies, epoxy acrylates, zirconium silicates, and $SiO_x$, and mixtures thereof, and each of said first and second electrically conductive coatings is selected from tin oxide, indium tin oxide, fluorine doped tin oxide, antimony doped tin oxide, IMI and mixtures thereof.

41. The electrochromic device as in claim 39, wherein said polycarbonate is selected from polycarbonate urethane, bisphenol A polycarbonate, polyether polycarbonate, polyester carbonate and diethylene glycol bis(allyl carbonate).

42. The electrochromic device as in claim 24, wherein said primer layer is selected from acrylates, polyurethanes, urethane acrylates, epoxies, epoxy acrylates, zirconium silicates and $SiO_x$, and mixtures thereof.

43. The electrochromic device as in claim 42, wherein each of said first and second electrically conductive coatings is selected from tin oxide, indium tin oxide, fluorine doped tin oxide, antimony doped tin oxide, IMI and mixtures thereof.

44. The electrochromic device as in claim 28, wherein said electrochromic medium is self-erasing.

45. The electrochromic device as in claim 32, wherein at least one of said first and second electrically conductive coatings is a two part coating comprising a first electrically conductive portion deposited from a metal cathode and a second electrically conductive portion deposited from a ceramic cathode.

46. The method according to claim 35, wherein both said first and second substrates are transparent and said primer layer is transparent.

47. The method according to claim 36, wherein both said first and second substrates are transparent, and said first and second primer layers are transparent.

48. The method according to claim 36, wherein said first electrically conductive coating forming comprises a first two part coating comprising a first electrically conductive portion deposited along said first substrate from a metal cathode, and a second electrically conductive portion deposited along said first substrate from a ceramic cathode, and said second electrically conductive coating comprises a second two part coating comprising a first electrically conductive portion deposited along said second substrate from a metal cathode, and a second electrically conductive portion deposited along said second substrate from a ceramic cathode.

* * * * *